United States Patent [19]

Girard

[11] Patent Number: 4,597,690
[45] Date of Patent: Jul. 1, 1986

[54] TUBE CLAMPS

[75] Inventor: Donald A. Girard, Rancho Cordova, Calif.

[73] Assignee: Girard Development Incorporated, Rancho Cordova, Calif.

[21] Appl. No.: 96,809

[22] Filed: Nov. 23, 1979

[51] Int. Cl.$^4$ .............................................. F16B 2/02
[52] U.S. Cl. .................................... 403/391; 403/312
[58] Field of Search ............... 403/391, 389, 312, 174, 403/178; 248/68 R, 74 R, 68 CB

[56] References Cited

U.S. PATENT DOCUMENTS

| | | | |
|---|---|---|---|
| 2,361,943 | 11/1944 | Issoglio et al. | 248/68 CB |
| 3,295,805 | 1/1967 | Girard | 248/68 CB |
| 3,682,422 | 8/1972 | Evans | 403/391 X |
| 3,856,244 | 12/1974 | Menshen | 248/68 CB |

FOREIGN PATENT DOCUMENTS

| | | | |
|---|---|---|---|
| 229642 | 10/1963 | Austria | 403/391 |
| 1014448 | 12/1965 | United Kingdom | 403/391 |

Primary Examiner—Andrew V. Kundrat
Attorney, Agent, or Firm—Owen, Wickersham & Erickson

[57] ABSTRACT

Tube clamps for use in fastening tubes to stationery support structures and particularly adapted for use in nuclear power plants and in other installations wherein a relatively large number of tube runs are involved requiring a relatively large number of tube clamps. The main embodiment of the invention provides a tube clamp assembly which is adapted to alternatively receive tubes of different sizes so that, for example, one tube clamp may be employed for two or more tube sizes thus reducing the number of units to be held in inventory. Another form of the invention permits the tube clamp assembly to be employed in a two-directional or three-directional manner as these terms are used in the industry.

2 Claims, 9 Drawing Figures

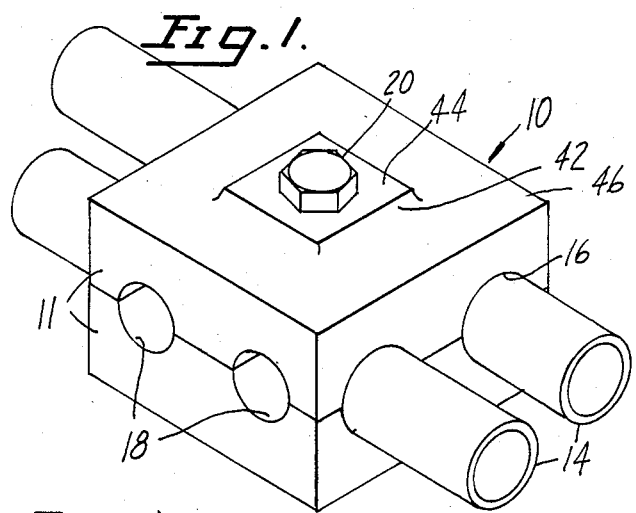
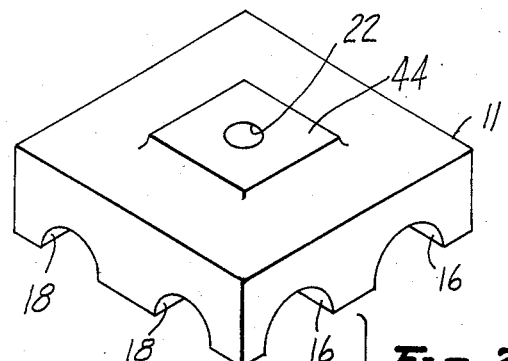
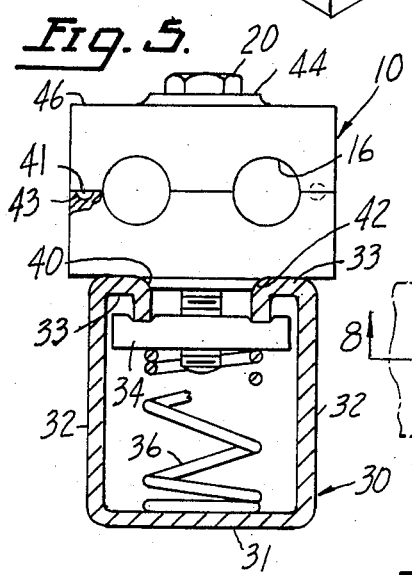
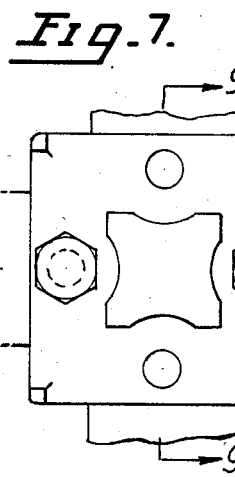
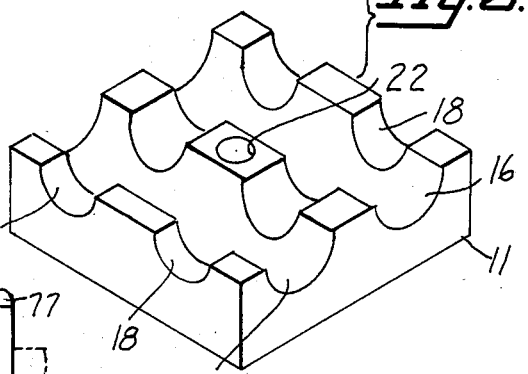
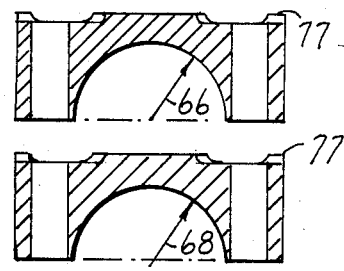
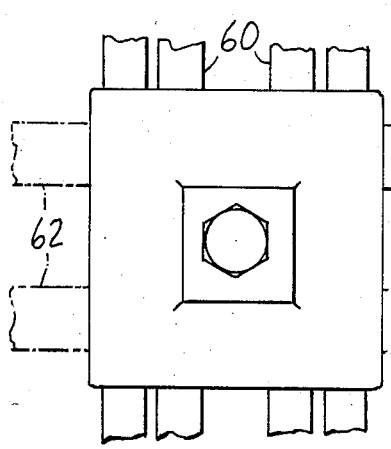
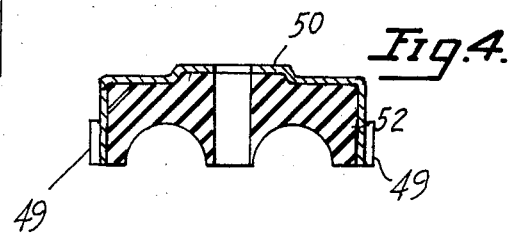

TUBE CLAMPS

This invention relates to tube clamps employed to secure tubes to a stationery support structure. More particularly the invention is suitable for use in nuclear power plants or in other installations wherein a relatively large number of clamps, say 30,000 to 40,000, are required to secure the tubing employed in the installation.

Heretofore when it was necessary to secure tubing in place it has been customary to provide a pair of opposed clamping elements secured together by a bolt to a fixed structure and formed with complementarily formed recesses for receiving therein one or more tubes of a particular size. In nuclear power plants approximately 95% of all tubing employed in the installation may be either ⅜" diameter or ½" diameter, and it is therefore extremely desirable from the standpoint of reducing inventory to employ a clamp which is adapted to receive, alternatively, either ⅜" or ½" tubing. Obviously the reduction in half of a number of clamps in the order 30,000 to 40,000 constitutes a considerable saving in expense.

It has also been found heretofore that a great amount of a pipefitter's time may be wasted, for a particular run of tubing, if he selects the wrong size clamp from stock and is required to take time to return the wrong clamp and obtain the correct one. The present invention obviates this loss of time.

Another requirement of tube clamps is that they be as compact as possible especially when such clamps are used in cooperation with "unistruts". In such cases it is essential that the overall dimensions of the clamps be a minimum in order to make efficient use of space.

The main object of the present invention is therefore the provision of a novel tube clamp which overcomes the disadvantages of prior tube clamps employed for a like function.

Another object of the invention is the provision of tube clamps of uniform size and design which, in the case of a large installation, permits a considerable saving in the cost of manufacture and also in the time employed by a pipefitter to install the same.

Another object of the invention is the provision of a tube clamp which may be employed alternatively either as a two-directional clamp or a three-directional clamp. What is meant by this is that a conventional clamp which restricts movement of the tube in two directions at right angles to each other, for example vertically and laterally, is termed a two-directional clamp. If the clamp also performs the function of squeezing or clamping the tube it prevents longitudinal shifting as well and is thus designated a three-directional clamp. By the present invention a choice may be made between the above noted clamping actions.

Other objects and advantages will be apparent from the following specification and from the drawings.

FIG. 1 is an isometric view of a typical clamp made in accordance with the present invention.

FIG. 2 is an exploded view of the upper and lower clamping elements of the clamp of FIG. 1 showing the construction thereof.

FIG. 3 is an isometric view showing a modified form of the clamp member of FIG. 1.

FIG. 4 is a cross section of the clamp element of FIG. 3 as taken along lines 4—4 of FIG. 3.

FIG. 5 is a vertical cross section through a unistrut showing the clamp of FIG. 1 secured thereto.

FIG. 6 is a top plan view of the clamp similar to that of FIG. 1 showing its use for more than two tubes.

FIG. 7 is a top plan view of a clamp which may be employed alternatively as a two-directional or three-directional clamp.

FIG. 8 is a cross section of one clamp member only taken in a plane indicated by lines 8—8 of FIG. 7.

FIG. 9 is a cross section of the same clamp member taken in a plane indicated by lines 9—9 of FIG. 7.

In detail and first with reference to FIG. 1, the preferred form of the clamp 10 comprises a pair of upper and lower identical clamping members 11. In this example the clamp is employed to receive therein a pair of parallel tubes 14 of a particular size and which tubes are received within complementarily formed recesses 16 extending from one end of the clamping member to the other. The clamp of FIG. 1 is also provided with recesses 18 extending at right angles to the recesses 16 and adapted to receive a pair of tubes having a dimension different from that of the tubes 14. As an example, the tubes 14 may have an approximate outside diameter of ½" while the tubes adapted to be received in the passages formed by recesses 18 may be adapted to receive ⅜" tubing therethrough. The clamp elements 11 are identical thus facilitating production and reducing the cost thereof. Each element is provided with a through opening 22 (FIG. 2) for receiving therethrough a bolt 20 which may be employed to secure the tube clamp to a fixed structure.

From a consideration of FIG. 2 it will be apparent that the clamp members 11 may be readily formed by machining, casting or preferably by a powdered metallurgy process thus permitting a high production rate, low cost and requiring no additional machining operations.

In most power plant installations the tubing is usually run in pairs and therefore the arrangement of FIG. 1 is a typical one. However, it will be understood that the clamp lends itself to use with one tube only of a particular size and permitting the alternative use of one tube or more tubes of another size.

In FIG. 5 the clamp of FIG. 1 is shown as secured to a fixed "unistrut" which is commonly employed in power plant installations. This unistrut, generally designated 30, is of generally channel shape including a bottom 31, opposite vertical sides 32 and inwardly and downwardly turned lips 33. A generally rectangular anchor piece 34 is yieldably pressed against the downwardly facing ends of lips 33 by means of a relatively light compression spring 36. By this structure the anchor 34 may be conveniently urged along the length of unistrut 30 to whatever position is desired for securing the clamp 10. The inwardly and upwardly facing rounded corners 40 of unistrut 30 are adapted to be engaged by the complementarily formed rounded corners 42 between a generally rectangular boss 44 and the outer face 46. The boss 44 being formed integrally with said outer face.

The flat outer side of boss 44 may engage a flat surface of another fixed member if the unistrut 30 is not employed. To insure that the clamp members are assembled correctly a small hemispherical projection 41 may be formed in each member which is adapted to be received in a complementarily formed recess 43 in the other member (FIG. 5).

Another form of the invention is shown in FIGS. 3, 4 wherein each clamping member comprises a pressed sheet metal outer body portion 50 into which is pressed an elastomer material 52 which is provided with the necessary recesses for receiving the tubing. This type of clamp is particularly suited for situations wherein vibrations are likely to be encountered. Another form of the clamp shown in FIGS. 3, 4 may include a pressed metal outer part suitable for use with tubes of different sizes so that the insertion of an elastomer material may convert the clamp to use with still other sizes of tubing. Lips 49, 51 may be formed integrally as indicated.

In FIG. 6 another form of the invention is shown wherein the clamp is adapted for use with four relatively small tubes, say ¼" diameter, which are designated 60 and which clamp may be alternatively employed with larger tubes, say ⅜" diameter designated 62.

In FIG. 7 still another form of the invention is shown wherein the clamp may be employed with only one tube of a particular size and another tube of the same or different size. In such a case it is desirable to provide four bolt holes as indicated to permit the alternative uses.

All of the above mentioned forms of the invention may include the three-directional type wherein the clamp not only holds the tubing against movement vertically and laterally, but also provides a clamping action squeezing the tubing so as to prevent longitudinal motion of the tubing. For example, in FIG. 8 the radius 66 has its center position so that the clamp fits the tube at a slight clearance thus providing a two-directional application. On the other hand, in FIG. 9 if the same size tube is to be used the radius 68 has its center offset slightly from the adjacent face of the clamp element so that the clamp may perform the three-directional function by squeezing the tube to hold it against longitudinal movement. This type of application is disclosed in U.S. Pat. No. 3,180,598 to which reference is made for details not set forth herein.

To assist in stabilizing the clamp of FIG. 7 when secured to a fixed flat surface relatively small corner bosses 77 may be formed on the outer surface of each clamp member.

It will be understood that variants of the above particular forms are contemplated. For example, the elastomer insert 52 of FIGS. 3, 4 may be formed in the manner shown in FIG. 9 to provide the three-directional function noted above.

It will be seen that the above described invention provides great economies in the time required for installation and also the costs involved in production of the clamps.

I claim:

1. A tube clamp comprising:
    a pair of opposed tube engaging members,
    means for clamping said members together,
    each of said members being provided with a first recess to permit corresponding recesses in the two members to cooperate as a pair with each other to provide a first through opening for receiving a conduit therein,
    each of said members being provided with a second recess and cooperating to form a second through opening for receiving a conduit therein, whereby said pairs of first and second recesses may be alternatively employed to receive a conduit therein,
    the outer side of each of said members being formed to provide a central boss spaced outwardly from said outer side and adapted to be received within a recess in a fixed structure.

2. A tube clamp according to claim 1 wherein said boss is formed around its periphery to a shape complementary to the shape of said recess in the fixed structure.

* * * * *